Nov. 19, 1968    H. L. MARCUS    3,412,253
ARRANGEMENT FOR MEASURING HYDROMETEORS
Filed Jan. 12, 1967    2 Sheets-Sheet 1

United States Patent Office 3,412,253
Patented Nov. 19, 1968

3,412,253
ARRANGEMENT FOR MEASURING
HYDROMETEORS
Holger L. Marcus, Lidingo, Sweden, assignor to AGA
Aktiebolag, Lidingo, Sweden, a corporation of Sweden
Filed Jan. 12, 1967, Ser. No. 608,822
Claims priority, application Sweden, Jan. 17, 1966,
545/66
4 Claims. (Cl. 250—218)

ABSTRACT OF THE DISCLOSURE

An apparatus for measuring hydrometeors in the atmosphere comprising a light transmitter for transmitting a beam of light and a receiver for receiving light reflected from the hydrometeors present in the surrounding atmosphere. Either the transmitter or the receiver is provided with optical correcting means for producing a radiation diagram in a plane comprising the principal axes of the transmitter and the receiver which prevents ambiguity in the results of the measurement.

---

The present invention relates to hydrometeor-responsive apparatus comprising a light transmitter for transmitting a beam of light and a receiver for receiving light reflected from the hydrometeors present in the surrounding atmosphere. The term hydrometeor is used to designate any form of moisture which may be present in condensed form in the atmosphere, such as cloud, fog rain, snow, hail etc. The presence of such hydrometeors in the atmosphere causes a certain collimation loss in the emitted light from a transmitter owing to dispersion and absorption of the light. For hydrometeors the absorption is negligible and only dispersion will be taken in account further on.

In measurement of this type the correlation between the collimation loss and the result of the measurement depends on the one hand, on the amount and spatial distribution of the hydrometeors and on the other hand, on the geometric arrangements of the measuring apparatus. If the hydrometeors are uniformly distributed, a satisfactory result can be obtained if the reflected light gives an information about hydrometeors at a small distance from the apparatus and the design of the apparatus will have to take into account primarily the intensity of the reflected light.

When the hydrometeors are unevenly distributed as well as when it is desired for the reflected light to supply information about hydrometeors up to large distances away from the apparatus, it has been found difficult to obtain a well-defined correlation between the collimation loss and the strength of the reflected light.

According to the present invention, these difficulties are obviated in apparatus of the above-mentioned kind comprising a light transmitter and a light receiver by a design of either the transmitter or the receiver to have a radiation diagram in a plane comprising the optical axes of the transmitter and the receiver in the form of a curve according to the function.

$$G = \frac{1}{1+\left(\frac{\varphi}{\varphi_0}\right)^n}$$

where G is the distribution function giving the strength of the radiated light in a direction at the angle $\varphi$ from the principal axis, $\varphi_0$ is the angle at which the light strength is down to one half of its maximum value and $n$ is an exponent determining the steepness of the flank and having a value of approximately 2.

By way of introduction to the invention there follows a brief statement of the theory of propagation of light and the influence hydrometeors exert by throwing back the light.

Figure 5:
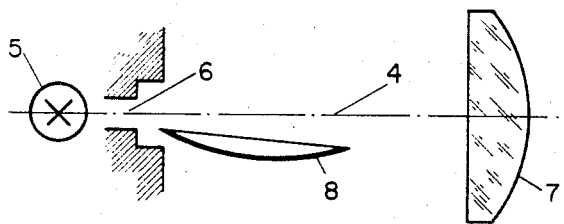
Figure 6:
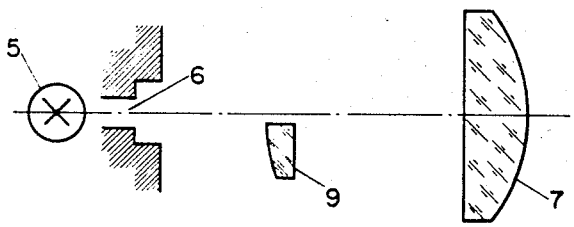

In the attached drawing FIGS. 1 to 4 and 7 are diagrams explaining the invention; and FIGS. 5 and 6 are embodiments of light transmitters according to the invention.

Figure 1:
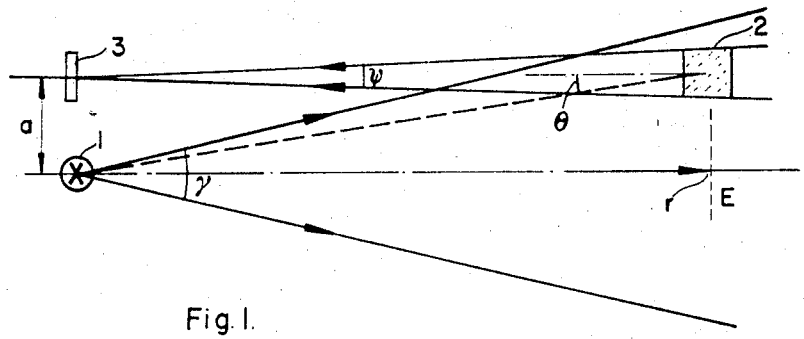
Figure 2:
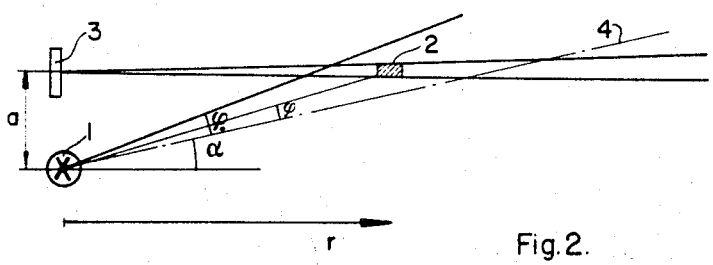

In FIG. 1, 1 is a light transmitter which sends out a beam of light confined within an angle $\gamma$, it being assumed to begin with that the light is uniformly distributed within the angle $\gamma$. If the propagation is lossless i.e. no hydrometeors are present, the strength E of the illumination at a given distance $r$ is $$E = I/r^2 \qquad (2)$$

where I is the intensity of the light emitted from the transmitter 1.

If hydrometeors are present, a collimation loss arises owing to dispersion and if the loss per unit distance is $\sigma$, the strength $E_1$ of the illumination will now be $$E_1 = \frac{I}{r^2} \cdot e^{-\sigma \cdot r} = \frac{I}{r^2} \cdot k \qquad (3)$$

where $e$ is the base of the natural logarithms and $k$ is a factor representing the collimation loss. Normally, $\sigma$ varies with the distance $r$, as a result of which the collimation loss is represented by a product $$k = \Pi(e^{-\sigma(r) \cdot dr}) = P(r) \qquad (4)$$

A volume element 2 which is at distance $r$ from the transmitter 1, when receiving the illumination E, causes secondary radiation of the intensity $$i = \frac{I \cdot k}{4\pi r^2} f(\theta) \cdot \sigma(r) \qquad (5)$$

where $\theta$ is the angle between incoming and outgoing light for equal to, $\theta$, in FIGURE 1, being measured with the outgoing light from transmitter 1 as a reference by experiments that the average value of $f(\theta)$ is approximately 0.5.

Positioned at a distance $a$ from the transmitter 1 is a receiver 3. The amount or reflected light received by the receiver depends on the solid angle $\psi$ covered by the receiver and on the distance between the latter and the hydrometeors causing the secondary radiation. The volume element scanned at distance $r$ is $$dv = \pi \cdot \psi^2 \cdot r^2 \cdot dr \qquad (6)$$

The total amount S of light returned to the receiver from all the hydrometeors present in the section of space being scanned is therefore $$S = \int \frac{i \cdot dv}{r^2} \cdot k = \frac{\psi^2 \cdot 0.5}{4} \int \frac{I}{r^2} \cdot P^2(r) \cdot \sigma(r) dr \cdot \qquad (7)$$

It is to be noted that if the optical axes of the transmitter and the receiver are not co-linear, the intensity I will also be a function of the distance $r$. This is apparent from FIGURE 2, in which the optical axis 4 of the transmitter is apart from the axis of the receiver 3 and forms the angle $\alpha$ with that of the receiver 3. If the distance between the transmitter 1 and the receiver 3 is $a$ the angle $\varphi$ between the optical axis 4 of the transmitter and the line joining the volume element 2 with the transmitter 1 is $$\phi = \arctan\frac{a}{r} - \alpha \cong \frac{a}{r} - \alpha \qquad (8)$$

The second equality being an approximation based on the assumption that $a/r$ is small relative to 1.

A transmitter 1 normally comprises optical means in the form of a collecting lens and a diaphragm, causing the transmitter to have its natural distribution diagram according to a function $G(\varphi)$, where $\varphi$ is the angular distance from the optical axis of the transmitter. If this characteristic of the transmitter is taken into account, the general expression for the amount of radiation returned to the receiver 3 is $$S = \frac{\psi^2 \cdot 0.5}{4} \int \frac{I_0 \cdot G(r)}{r^2} \cdot P^2(r) \cdot \sigma(r) \cdot dr \qquad (9)$$

Figure 3:
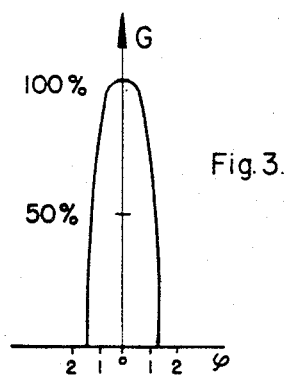

In apparatus hitherto used for measuring the effect of hydrometeors, the optical members of the light transmitter had a distribution diagram presenting a more or less flattened top with very steep flanks. This diagram representing G as a function of $\varphi$ is shown in FIG. 3. It follows from the form of this diagram that at the angle $\varphi = 1°$ the intensity may be down to one-half of its largest value and at $\varphi = 1.3°$ to zero. A calculation shows that with this form of diagram there is an ambiguous relationship between the intensity S of the received signal and the loss $\sigma$ per unit length caused by the hydrometeors. A graph representing S as a function of the range of visibility resulting from a certain amount of hydrometeors per unit volume will therefore have the form of the curve A in FIG. 4. It is apparent from the graph that if the range of visibility decreases from a certain high value (corresponding to a low value of the number of magnitude of the hydrometeors) the intensity of the returned light increases up to a maximum $S_{max}$, whereupon the intensity of the returned light again decreases. The outcome of this is that a certain intensity of received signal, such as indicated by the dashline $S_a$, may mean either that visibility is low, corresponding to the point $A_1$ (hydrometeors in large number or of large size) or that visibility is good corresponding to the point $A_2$ (hydrometeors in small number or of small size). Due to this ambiguity, additional observation is therefore required to enable a correct interpretation of the result.

It is to be noted in this connection that it may be desired to obtain from the receiver a signal which represents without ambiguity the conditions within a range, which may extend considerably beyond the distance corresponding to the value $S_{max}$.

The difficulties resulting from the above mentioned ambiguity are removed by the arrangement according to the invention, in which the transmitter (or the receiver) is combined with optical correcting members causing the radiation diagram to have the form of a curve according to the Equation 1 where $\varphi_0$ is the angle for which the light intensity is down to one half of its maximum value, $n$ is an exponent representing the steepness of the flank and having a value of substantially 2 according to the present invention. The result of this is a diagram representing the strength S of the received signal as a function of visibility in meters as shown by the curve B in FIG. 4. Owing to the form of this curve, each value of S corresponds to one and only one value of visibility.

It has been found that S is a single-valued function if $n$ is made to have a value of approximately 2 or lower. In some applications, particularly if it is desired to have good correlation between the function $P(r)$ and S irrespective of the distance at which the collimation loss arises, it can be shown that a value of $n$ about or immediately below 2 gives the best results.

FIGS. 5 and 6 represent two embodiments of a light transmitter according to the invention. The FIG. 5 arrangement has a diverging mirror and that of FIG. 6 a diverging prism to produce the desired form of radiation diagram.

The FIG. 5 transmitter comprises a light source in the form of a lamp 5, which is mounted together with the other optical members of the transmitter in a housing of normal design and not shown on the drawing. There is further provided a diaphragm 6, which may serve the additional function of supporting a filter, not shown in the drawing, and a collecting lens 7, which would cause the light to issue as a substantially parallel beam according to the diagram of FIG. 3, if no further optical elements were provided for.

The desired form of the diagram is obtained in the FIG. 5 arrangement by means of a correcting means in the form of diverging mirror 8 placed between the lamp 5 and the lens 7. As shown, the mirror is placed so as not to obstruct light which contributes to the highest strength of the radiation, the mirror being placed laterally of the geometrical axis 4 from the lamp to the centre of the lens 7.

In the FIG. 6 arrangement, the correcting means comprises a refractor 9, such as a prism or a lens, inserted between the lamp 5 and the lens 7.

Figure 7:
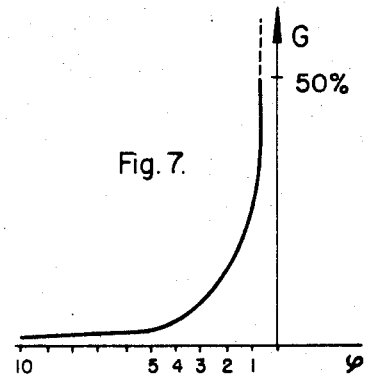
Figure 4:
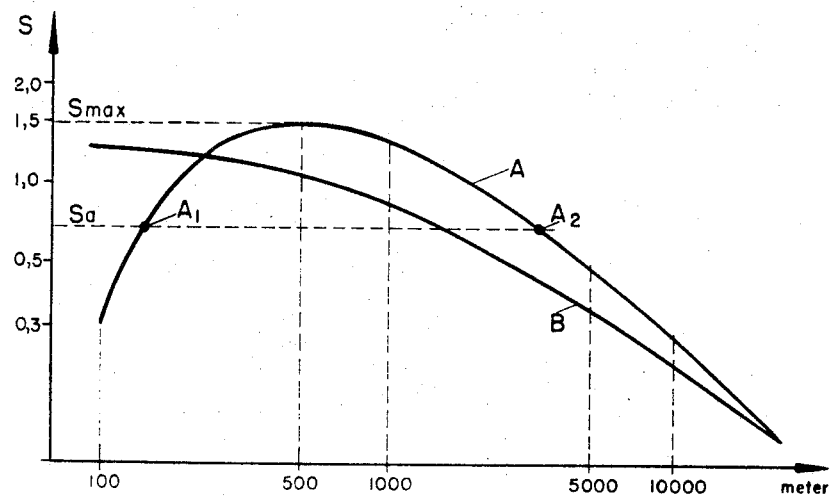

In both the arrangements shown, the correcting means is unsymmetrically arranged, because the desired shape of the radiation diagram is required only within that portion of the plane comprising the optical axes of the transmitter and the receiver within which the diagrams of the transmitter and of the receiver overlap. Within this portion, owing to the influence of the correcting members, the diagram will have the shape indicated in FIG. 7. Of importance in this connection is only the intensity of the radiation at angles larger than 1°, and therefore only this portion of the diagram is shown in FIG. 7. The intensity of the radiation is down to one half, corresponding to the angle $\varphi_0$, when the value of $\varphi$ is 0.7°. It is noted that the correcting means of FIGURES 5 and 6 are so designed and mounted such that the amount of light which is deviated into a certain direction has a value in accordance with Equation 1 set forth hereinbefore. Since the total resultant light is dependent upon a superposition of the primary light, unavoidable scattered light and the additional light which is deviated in accordance with the invention, the exact positioning of the correcting members (mirror 8 or refractor 9) must be determined by means of light measurements so that the shape of the radiation diagram may be made to correspond to that set forth in Equation 1. Such determinations can be readily made by one of ordinary skill in the art as soon as the desired shape of the radiation diagram is known.

What is claimed is:

1. Arrangement for measuring hydrometeors comprising a light transmitter device and a light receiver device, characterized in that one of said devices has a radiation diagram in a plane comprising the principal axes of the transmitter and the receiver having the form of a curve according to the function $$G = \frac{1}{1 + \left(\frac{\varphi}{\varphi_0}\right)^n}$$

where G is the strength of the transmitted light at the angular distance $\varphi$ from said axis, $\varphi_0$ is the angle corresponding to one-half of the maximum light intensity and $n$ is an exponent having a value of approximately 2.

2. An arrangement as defined in claim 1, characterized by optical correcting means comprising a mirror inserted between the light source of the transmitter and a lens thereof, the correcting means being positioned so as not to influence light rays contributing to the maximum light intensity.

3. An arrangement as defined in claim 1, characterized by optical correcting means comprising a refractor inserted between the light source of the transmitter and a lens thereof.

4. An arrangement as defined in claim 2, characterized in that the optical correcting means is unsymmetrical relative to the principal axis of the transmitter so as to cause the desired form of radiation diagram in the portion of the plane comprising the principal axes of the transmitter and the receiver within which the radiation diagrams of the transmitter and the receiver overlap.

References Cited

UNITED STATES PATENTS

| | | | |
|---|---|---|---|
| 3,094,625 | 6/1963 | Hendrick | 250—218 |
| 3,126,521 | 3/1964 | Brady | 250—218 X |
| 3,146,293 | 8/1964 | Lesage | 250—218 X |

RALPH G. NILSON, *Primary Examiner.*

M. A. LEAVITT, *Assistant Examiner.*